United States Patent
Arad et al.

(10) Patent No.: US 9,171,030 B1
(45) Date of Patent: Oct. 27, 2015

(54) EXACT MATCH LOOKUP IN NETWORK SWITCH DEVICES

(71) Applicant: Marvell Israel (M.I.S.L) Ltd., Yokneam (IL)

(72) Inventors: Carmi Arad, Nofit (IL); Gil Levy, Hod Hasharon (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

(21) Appl. No.: 13/737,608

(22) Filed: Jan. 9, 2013

Related U.S. Application Data (60) Provisional application No. 61/584,777, filed on Jan. 9, 2012, provisional application No. 61/644,377, filed on May 8, 2012.

(51) Int. Cl.
  *G06F 17/30* (2006.01)
(52) U.S. Cl.
  CPC .................................. *G06F 17/3033* (2013.01)
(58) Field of Classification Search
  CPC ..................... G06F 17/30946; G06F 17/30949
  USPC ......................................................... 707/698
  See application file for complete search history.

(56) References Cited

U.S. PATENT DOCUMENTS

| | | | |
|---|---|---|---|
| 5,032,987 A * | 7/1991 | Broder et al. | 711/221 |
| 6,035,107 A | 3/2000 | Kuehlmann et al. | |
| 6,249,521 B1 | 6/2001 | Kerstein | |
| 6,363,396 B1 | 3/2002 | Klots et al. | |
| 6,430,170 B1 | 8/2002 | Saints et al. | |
| 6,614,758 B2 | 9/2003 | Wong et al. | |
| 6,735,670 B1 * | 5/2004 | Bronstein et al. | 711/108 |
| 6,973,082 B2 | 12/2005 | Devi et al. | |
| 7,190,696 B1 | 3/2007 | Manur et al. | |
| 7,280,527 B2 | 10/2007 | Basso et al. | |
| 7,346,706 B2 | 3/2008 | Rezaaifar et al. | |
| 7,539,750 B1 | 5/2009 | Parker et al. | |
| 7,554,914 B1 | 6/2009 | Li et al. | |
| 7,567,567 B2 | 7/2009 | Muller et al. | |
| 7,580,417 B2 | 8/2009 | Ervin et al. | |
| 7,613,209 B1 | 11/2009 | Nguyen et al. | |
| 7,623,455 B2 | 11/2009 | Hilla et al. | |
| 7,639,614 B2 | 12/2009 | Nakagawa et al. | |

(Continued)

OTHER PUBLICATIONS

Rasmush Pagh and Flemming Friche Rodler, "Cuckoo Hashing" Journal of Algorithms, vol. 51 (2004), pp. 122-144.*

(Continued)

*Primary Examiner* — Apu Mofiz
*Assistant Examiner* — Farhad Agharahimi (57) ABSTRACT

In a method for populating a lookup table, a plurality of hash tables are provided. Each hash table is accessed by a respective hash function. A plurality of hashed values for a key are generated using the hash functions corresponding to the plurality of hash tables. The plurality of hashed values are used to determine whether the key can be inserted into one or more hash tables of the plurality of hash tables without colliding with keys previously stored at respective locations corresponding to the determined hashed values. When it is determined that the key can be inserted into multiple hash tables, it is then determined which one of the multiple hash tables is populated with the greatest number of keys. The hash table that is populated with the greatest number of keys is selected for insertion of the key, and the key is inserted into the selected hash table.

20 Claims, 5 Drawing Sheets

(56) References Cited

U.S. PATENT DOCUMENTS

| | | | |
|---|---|---|---|
| 7,796,594 | B2 | 9/2010 | Melman et al. |
| 7,821,925 | B2 | 10/2010 | Davies |
| 7,821,931 | B2 | 10/2010 | Swenson et al. |
| 7,898,959 | B1 | 3/2011 | Arad |
| 7,969,880 | B2 | 6/2011 | Yano et al. |
| 7,979,671 | B2 | 7/2011 | Aviles |
| 8,238,250 | B2 | 8/2012 | Fung |
| 8,243,594 | B1 | 8/2012 | Fotedar et al. |
| 8,274,971 | B2 | 9/2012 | Battle et al. |
| 8,339,951 | B2 | 12/2012 | Scaglione |
| 8,355,328 | B2 | 1/2013 | Matthews et al. |
| 8,364,711 | B2 | 1/2013 | Wilkins et al. |
| 8,503,456 | B2 | 8/2013 | Matthews et al. |
| 8,587,674 | B2 | 11/2013 | Iwata |
| 8,625,594 | B2 | 1/2014 | Safrai et al. |
| 8,756,424 | B2 | 6/2014 | Roitshtein et al. |
| 8,792,497 | B2 | 7/2014 | Rajagopalan et al. |
| 8,848,728 | B1 | 9/2014 | Revah et al. |
| 2002/0093952 | A1 | 7/2002 | Gonda |
| 2004/0073640 | A1 | 4/2004 | Martin et al. |
| 2006/0251109 | A1 | 11/2006 | Muller et al. |
| 2008/0031263 | A1 | 2/2008 | Ervin et al. |
| 2008/0037544 | A1 | 2/2008 | Yano et al. |
| 2008/0049774 | A1 | 2/2008 | Swenson et al. |
| 2008/0052488 | A1* | 2/2008 | Fritz et al. ............ 711/216 |
| 2008/0181103 | A1 | 7/2008 | Davies |
| 2008/0205655 | A1 | 8/2008 | Wilkins et al. |
| 2009/0196303 | A1 | 8/2009 | Battle et al. |
| 2010/0023726 | A1 | 1/2010 | Aviles |
| 2011/0013627 | A1 | 1/2011 | Matthews et al. |
| 2012/0136846 | A1* | 5/2012 | Song et al. ............ 707/698 |
| 2014/0301394 | A1 | 10/2014 | Arad et al. |

OTHER PUBLICATIONS

Demetriades, et. al., "An Efficient Hardware-based Multi-hash Scheme for High Speed IP Lookup" 16th IEEE Symposium on High Performance Interconnects, Aug. 2008.*

Demetriades et al., "An Efficient Hardware-based Multi-hash Scheme for High Speed IP Lookup," 2008 16$^{th}$ IEEE Symposium on High Performance Interconnects, Aug. 2008.

Demetriades et al., "An Efficient Hardware-based Multi-hash Scheme for High Speed IP Lookup," 2008 16th IEEE Symposium on High Performance Interconnects, Aug. 2008.

Herlihy et al., "Hopscotch Hashing," *DISC '08 Proceedings of the 22nd International Symposium on Distributed Computing*, pp. 350-364 (Sep. 22, 2008).

"Hopscotch Hashing," Wikipedia entry downloaded from http://en.wikipedia.org/wiki/Hopscotch_hashing on Oct. 6, 2014 (3 pages).

Peng et al., "Content-Addressable memory (CAM) and its network applications," International IC—Taipei Conference Proceedings, May 2000.

Raoof, K., Prayongpun, N., Impact of Depolarization Effects on MIMO Polarized Wireless Configuration, Wireless Communications, Networking and Mobile Computing, 2007. WiCom 2007, pp. 1-4 (Sep. 2007).

Shavit, Nir, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

Thaler et al., "Multipath Issues in Unicast and Multicast Next-Hop Selection," The Internet Society, pp. 1-10 (2000).

U.S. Appl. No. 12/537,078, "Hash Computation for Network Switches," filed Aug. 6, 2009 (Mizrahi, et al.).

U.S. Appl. No. 13/115,670, "Methods and Apparatus for Handling Multicast Packets in an Audio Video Bridging (AVB) Network," filed May 25, 2011 (Pannell).

U.S. Appl. No. 13/737,608, "Exact Match Lookup in Network Switch Devices," filed Jan. 9, 2013 (Arad et al.).

U.S. Appl. No. 61/695,520, "Efficient TCAM Architecture," filed Aug. 31, 2012 (Levi et al.).

IEEE Std 802.1Q, 2003 Edition, "IEEE Standards for Local and Metropolitan area networks—Virtual Bridged Local Area Networks," the Institute of Electrical and Electronics Engineers, Inc., 327 pages (May 7, 2003).

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

* cited by examiner

EXACT MATCH LOOKUP IN NETWORK SWITCH DEVICES

CROSS-REFERENCES TO RELATED APPLICATION

The present application claims the benefit of U.S. Provisional Application Nos. 61/584,777, entitled "Network Devices using Cuckoo Hashing," filed on Jan. 9, 2012, and 61/644,377, entitled "Exact Match Lookup," filed on May 8, 2012, the disclosures of which are hereby expressly incorporated herein by reference in their entireties.

FIELD OF TECHNOLOGY

The present disclosure relates generally to network devices, and more particularly, to hash lookup tables in network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, routers, edge devices and the like, often employ lookup tables that store various information associated with packets processed by the network devices, and a network device performs lookups in the lookup tables for making various processing decisions during processing of packets by the network device. For example, lookup operations may be performed for packet classification, forwarding decisions, quality of service classifications, policy control list applications, and other processing operations generally performed by network devices. In general, a lookup for a packet is performed according to a key associated with or generated for the packet. The key is used to search a table, for example, and information relevant to the packet (e.g., forwarding information for the packet) is retrieved from an entry in the table identified by the key. Some lookup tables are implemented using content addressable memory (CAM). A CAM based table is a fully associative array that generally allows all keys provided to the table to be inserted into the table as long as the maximum number of table entries has not been exceeded. However, while a CAM table allows insertion of all keys provided to the table, CAM based tables generally are expensive in terms of area and power consumption, especially when large size lookup tables are employed.

An alternative implementation of a lookup table utilizes a hash based scheme in which a hash function is applied to a key to determine a location in the hash table at which the key and information associated with the key (e.g., forwarding information) are stored. While hash tables are generally smaller and more efficient compared to CAM implementations, hash tables exhibit inherent collisions when a hash function generates the same hashed values for two or more different keys provided to the hash function, and as a result, some keys provided to a hash table cannot be inserted into the hash table. Therefore, a lookup operation for some keys provided to a hash table will not produce a match. Thus, it is difficult to achieve exact match lookup performance when hash tables are employed. Various techniques, such as increasing hash table size or utilizing auxiliary search mechanisms to resolve hash collisions, have been employed to overcome the inherent deficiencies of conventional hash tables. However, such techniques are generally inefficient and can ultimately reduce desirability of using hash tables to perform exact match lookups.

SUMMARY OF THE DISCLOSURE

In to an embodiment, a method for populating a lookup table includes providing a plurality of hash tables, wherein each hash table in the plurality of hash tables is accessed by a respective hash function. The method also includes generating a plurality of hashed values for a key using the hash functions corresponding to the plurality of hash tables and using the plurality of hashed values to determine whether the key can be inserted into one or more hash tables of the plurality of hash tables without colliding with keys previously stored at respective locations corresponding to the determined hashed values. The method additionally includes, when it is determined that the key can be inserted into multiple hash tables, determining which one of the multiple hash tables is populated with the greatest number of keys. The method further includes selecting the hash table that is populated with the greatest number of keys and inserting the key into the selected hash table.

In another embodiment, a network device comprises a plurality of ports and a packet processor coupled to the plurality of ports, the packet processor configured to process packets received via at least some of the plurality. The packet processor comprises a lookup table that includes a plurality of hash tables, a plurality of hash functions, wherein each hash function corresponds to a respective hash table of the plurality of hash tables, and a key insertion unit configured to generate a plurality of hashed values for a key using the hash functions corresponding to the plurality of hash tables. The key insertion unit is also configured to determine, using the plurality of hashed valued, whether the key can be inserted into one or more hash tables from the plurality of hash tables without colliding with keys previously stored at respective locations corresponding to the determined hashed values. The key insertion unit is additionally configured to when it is determined that the key can be inserted into multiple hash tables, determine which one of the multiple hash tables is populated with the greatest number of keys. The key insertion unit is further configured to select the hash table that is populated with the greatest number of keys and insert the key into the selected hash table.

DETAILED DESCRIPTION

Figure 1:
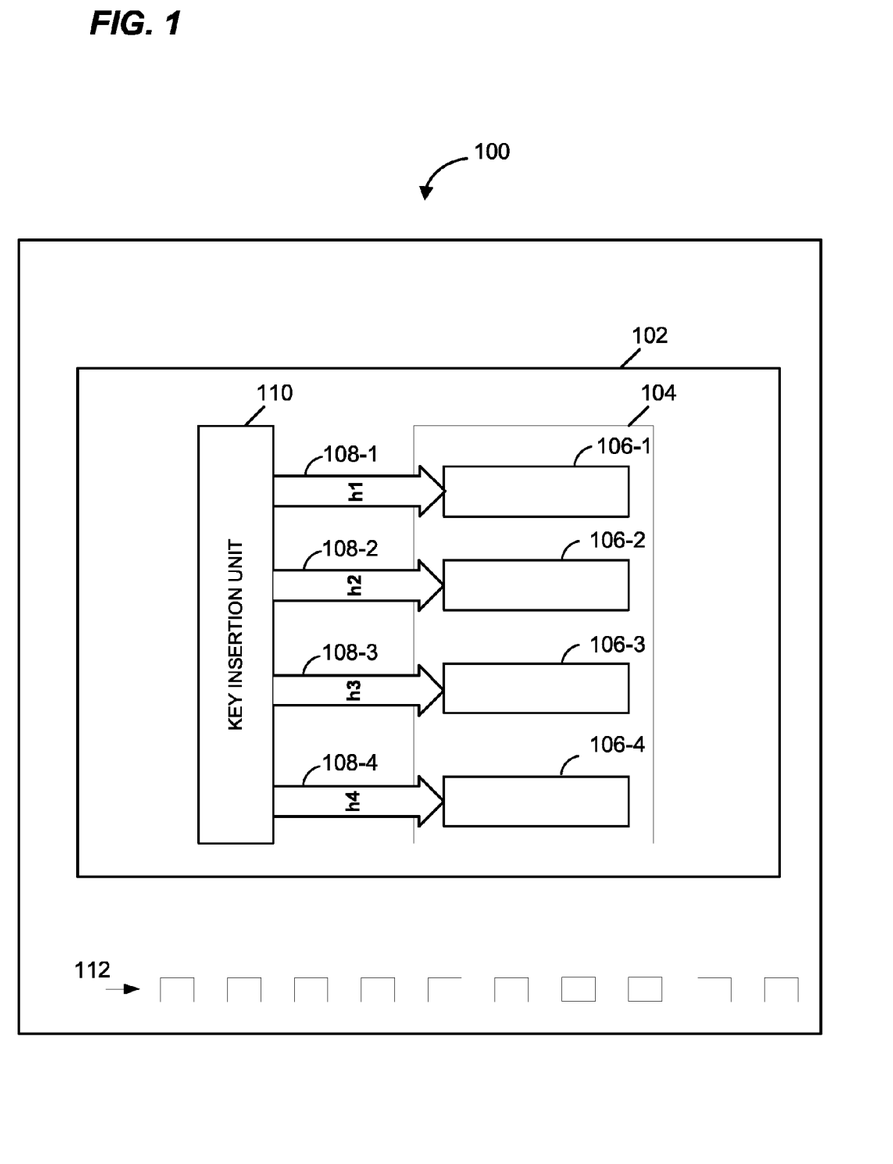
FIG. 1 is a simplified block diagram of an example network device that utilizes a multi-hash lookup table for performing various lookup operations, in accordance with an embodiment of the present disclosure.

FIG. 1 is a simplified block diagram of an example network device 100 that utilizes a multi-hash lookup table 104 for performing various lookup operations, in accordance with an embodiment of the present disclosure. The switching device 100 is generally a computer networking device that connects two or more computer systems, network segments, subnets, and so on. For example, the switching device 100 is a router, in one embodiment. It should be understood, however, that the switching device 100 is not necessarily limited to a particular protocol layer or to a particular networking technology (e.g., Ethernet). For instance, the switching device 100 could also be a bridge, a VPN concentrator, etc.

The network device 100 includes a packet processor 102, which includes a lookup table 104 and a key insertion unit 110 configured to populate the lookup table 104. The packet processor 102 is coupled to a plurality of ports 112, and each of the ports 112 is coupled to a communication network (e.g., to a network device within a communication network). The packet processor 102 generally processes packets ingressing via ports 112 including one or more of i) making forwarding decisions (i.e., for egress via ports 12), ii) determining whether a packet should be trapped or mirrored to another processor (not shown) for further analysis, iii) determining whether a packet should be discarded, etc. To determine actions to be performed on a packet, the packet processor 102 generates a key for the packet, and utilizes the key to access the lookup table 104 to retrieve processing information for the packet, and utilizes the retrieved information to perform processing of the packet. For example, in some embodiments, the lookup table 104 is a forwarding database that stores associations between the ports 112 of the network device 100 and addresses (e.g., MAC addresses) of network device connected to the ports 112. In these embodiments, the packet processor 102 utilizes the lookup table 104 to determine or "look up" an egress port 112 to which a packet should be forwarded using the destination address contained in a header of the packet as the key to access the lookup table 104. As another example, in some embodiments, the lookup table 104 is a policy control database that stores associations between a key and one or more policy control actions (e.g., with regard to access control, quality of service, flow measurements, VLAN assignments, etc) to be performed on a packet corresponding to the key. In other embodiments, the lookup table 104 stores other information generally used by the network device 100 to process packets received by the network device 100.

In the embodiment of FIG. 1, the lookup table 104 is implemented as a multi-hash table that includes or is subdivided into a plurality of hash tables 106, with each of the hash tables 106 accessed by a corresponding hash function 108. In operation, the key insertion unit 110 receives a key and information associated with the key to be inserted into the lookup table 104, applies a respective hash function 108 to the key to generate a respective hashed value for the key, utilizes the respective hashed values as indices into the hash tables 106, and determines whether the key and the information associated with the key can be inserted into one or more of the hash tables 106. As is known, a collision in a hash table may occur for an attempt to insert a key into the hash table when a hash function used to access the hash table produces the same hashed value for several (e.g., 2, 3, etc.) different keys. In this case, insertion of a key that hashes to the same value as a previously inserted key into the hash table results in a collision with the already inserted key. As a result, insertion of some keys into the hash table cannot be performed, and for such keys a consequent search of the hash table will not produce a match. While this situation is acceptable in some application, search tables that support insertions of all keys provided to the search table are required in some embodiments. For example, a lookup table with a maximum number of entries equal to X is required to allow insertion of the first X keys provided to the search table, in such embodiments.

The multi-hash structure of the lookup table 104 generally reduces collision occurrence for keys provided for insertion to the lookup table 104 compared to a similar sized single-hash table that utilizes a single hash function to access the hash table. A collision, or a missed insertion, in the multi-hash lookup table 104 can nonetheless occur in some situations when the indexed location in each of the hash tables 106 is already occupied by keys that previously hashed to the same location in the hash table 106. In an embodiment, to reduce occurrence of such collisions in the lookup table 104, performance of the lookup table 104 is optimized according to a "first miss" factor determined or estimated for the lookup table 104. The first miss factor is generally defined as the utilization of the multi-hash lookup table 104 (i.e., the percentage of entries stored in the multi-hash lookup table 104 with respect to the maximum number of entries supported by the multi-hash lookup table 104) when a first missed insertion of a key is encountered in the multi-hash lookup table 104. Accordingly, a first miss factor equal to or close to 100% results in a highly utilized and efficient multi-hash lookup table 104. In at least some embodiments, due to the multi-hash structure of the lookup table 104 and through the use of efficient insertion techniques for populating the lookup table 104 in accordance with various embodiments described below, a suitably high first miss factor is achieved for the multi-hash lookup table 104.

In an embodiment, upon determining the key can be inserted into one or more hash tables 106, the key insertion unit 110 inserts the key and the information associated with the key into one of the hash tables 106. When it is determined that the key can be inserted into multiple hash tables 106, the key insertion unit 110 selects the most populated hash table 106 (i.e., the hash table 106 that is currently populated with the greatest number of keys) from the multiple hash tables 106, and inserts the key into the selected most populated hash table 106. Maintaining an unbalanced load of the lookup table 106 by selecting a most populated hash table 106 from the multiple available hash tables 106, and inserting the key into the selected most populated hash table 106, generally improves the first miss utilization of the multi-hash lookup table 104, according to an embodiment.

In some embodiments, once populated, the lookup table 104 is static and, accordingly, remains unchanged during operation of the network device 100. In other embodiments, at least some entries in the lookup table 104 are dynamically deleted and/or new entries are dynamically inserted into the lookup table 104 during the operation of the network device 100. For example, keys are inserted into the lookup table 104 in response to automatic learning performed by the packet processor 102 during operation of the network device 100, such as obtaining addresses of devices connected to ports 112 and inserting the addresses as keys to be used for forwarding subsequent packets to a particular port 112 according to destination addresses associated with the packets, for example. On the other hand, some entries are deleted from the lookup table 104 during operation from the network device 100, for example in an aging scheme in which an entry is deleted in an event that the entry has not been accessed for a certain period of time.

Figure 2:
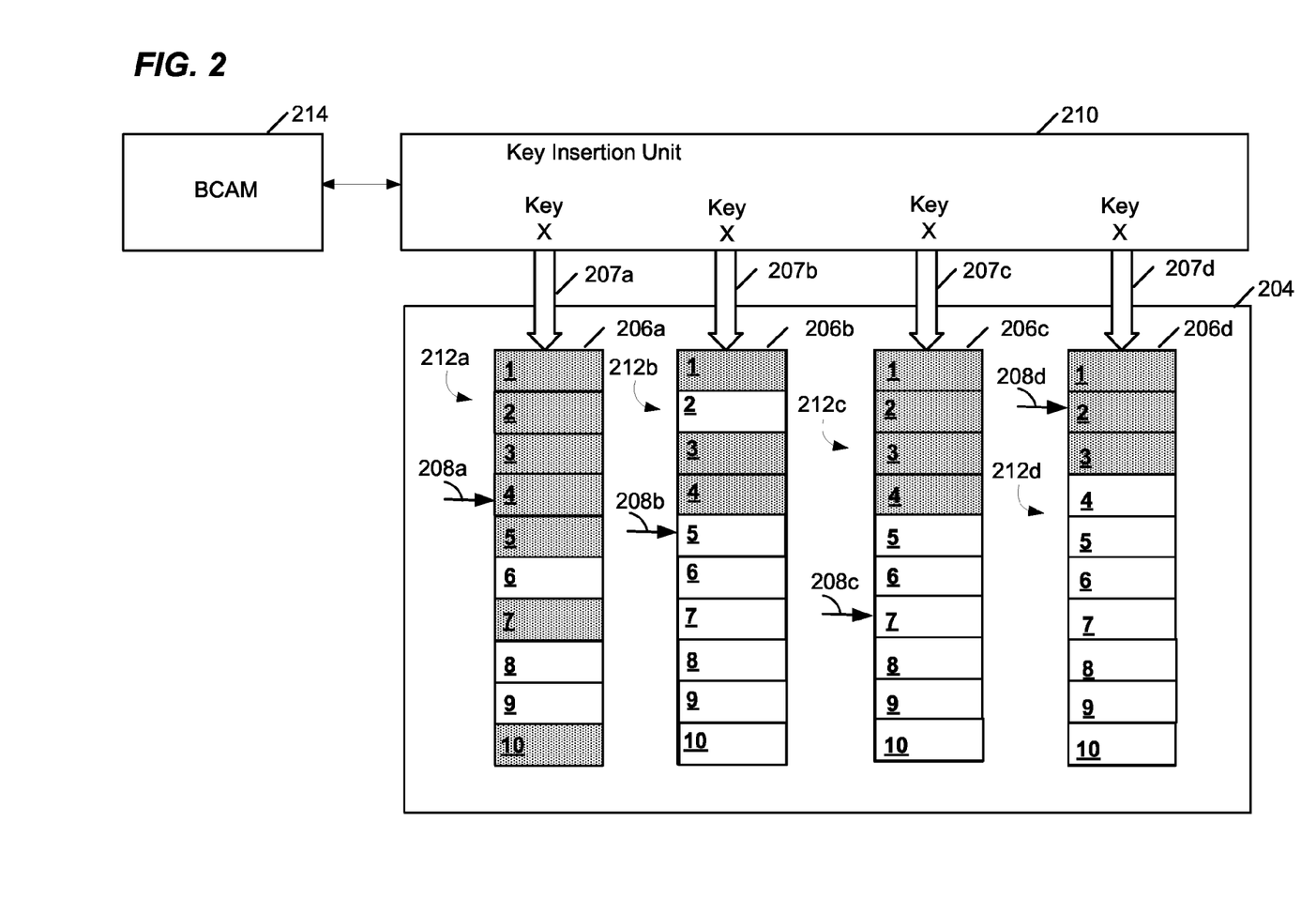
FIG. 2 is a diagram illustrating an example technique for populating an example lookup table, according to an embodiment.

FIG. 2 is a diagram illustrating an example technique for populating an example lookup table 204, according to an embodiment. Referring to FIG. 1, the lookup table 204 is utilized in the packet processor 102 of the network device 100, in some embodiments. For example, the lookup table 204 corresponds to the lookup table 102 of FIG. 1, in one embodiment. In another embodiment, the lookup table 204 is utilized by another suitable network device. Similarly, the network device 100 utilizes a suitable lookup table other than the lookup table 204, in another embodiment.

The lookup table 204 includes or is sub-divided into a plurality of hash tables 206, and each table 206 includes a plurality of entries 212. In an embodiment, each of the hash tables 206 is accessed by a respective hash function 207. A key insertion unit 210 is provided for inserting keys into the lookup table 204, in an embodiment. Each hash function 207 is generally a different hash function with respect to the other hash functions 207, in an embodiment. In some embodiments, the hash functions 207 are at least substantially uncorrelated or orthogonal with respect to each other, although this need not be the case. In at least some embodiments and/or scenarios, providing multiple hash tables for inserting keys increases the probability of inserting any given key into the lookup table 204 without encountering a collision in the lookup table 204, and providing at least substantially orthogonal hash functions 207 corresponding to the multiple hash tables 206 further reduces the probability of encountering a collision for any given key, in at least some embodiments and/or scenarios.

For the purpose simplicity and ease of explanation, in the embodiment of FIG. 2, the lookup table 204 includes four hash tables 206. In other embodiments, however, the lookup table 204 includes a different number (e.g., 2, 3, 5, 6, 7, etc.) of hash tables 206. Similarly, for the purpose of simplicity and ease of explanation, each hash table 206 is illustrated as including ten entries 212, although each hash table 206 includes other suitable numbers of entries 212 in other embodiments. As an example, each hash table 206 includes 100 or 1000 entries, in some embodiments. Further, because a different hash function 207 is provided for each of the hash tables 206, the hash tables 206 need not include equal numbers of entries 212, and at least some of the hash tables 206 include unequal numbers of entries 212 in some embodiments. In some embodiments, the number of the hash tables 206 and/or the number of entries 212 in each of the hash tables 206 is selected according to an algorithm that optimizes performance of the lookup 204 as a tradeoff of circuit area occupied by and/or the amount of power consumed by the lookup table 204. In some embodiments, the number of the hash tables 206 and/or the number of the table entries 212 in each of the hash tables 206 are selected such that the overall size of the lookup table 204 is a power of two (e.g., the overall number of entries 212 in the lookup table 204 is 64k, 128k, 256k, or any other suitable number that is a power of two). On the other hand, in at least some embodiments, the number of the hash tables 206 and/or the number of the table entries 212 in each of the hash tables 206 are selected such that the overall size of the lookup table 204 is not a power of two. It is to be noted that in at least some embodiments in which the overall table size of the hash table 204 is not a power of two, performance and utilization of the hash table 204 is not degraded when key insertion techniques of the present disclosure are utilized.

In the example scenario illustrated in FIG. 2, the key insertion unit 210 attempts to insert a key X into the lookup table 204. Shading of an entry 212 in a hash table 206 in FIG. 2 signifies that the entry is already occupied by a previously inserted key into the hash table 206 in the example scenario illustrated in FIG. 2. Thus, for example, out of the ten entries 212a in the hash table 206a, the entries 1 through 5, 7 and 10 are occupied by keys already inserted into the hash table 206a, while entries 6, 8 and 9 are available for insertions of new keys into the hash table 206a. As illustrated by the shading in the hash tables 206, in the scenario of FIG. 2, the hash table 206a includes seven entries 212a that are currently populated with keys, the hash table 206b includes three entries 212b that are currently populated with keys, the hash table 206c includes four entries 212c that are currently populated with keys, and the hash table 206d includes three entries 212 that are currently populated with keys.

In an embodiment, to insert the key X into the lookup table 204, the key insertion unit 210 provides the key X to each of the hash functions 207, and each of the hash functions 207 generates a respective index 208 into a corresponding hash table 206. In particular, in the embodiment of FIG. 2, the hash functions 204a generates the index 208a corresponding to the entry 4 in the hash table 206a, the hash functions 204b generates the index 208b corresponding to entry 5 in the hash table 206b, the hash functions 204c generates the index 208c corresponding to the entry 7 in the hash table 206c, and the hash functions 204d generates the index 208d corresponding to the entry 2 in the hash table 206d. Using the generated indices 208a-208d, the key insertion unit 202 identifies one or more hash table 206 that allow insertion of the key X into the hash table 206 (i.e., one or more hash tables 206 in which insertion of the key X does not result in a collision with a previously entered key into the hash table 206). According to an embodiment, when the key insertion unit 210 determines that more than one hash table 206 allows insertion the key X, the key insertion unit 210 inserts the key X (and the information associated with the key X) into the most populated table 206 of the multiple identified hash tables 206. In the example scenario illustrated in FIG. 2, because the entry 5 in the hash table 206b and the entry 7 in the hash table 206c are not currently occupied by keys, the key insertion unit 202 identifies the tables 206b and 206c as the hash tables 206 that allow insertion of the key X. Because the hash table 206b is populated with less entries compared to the hash table 206c (three populated entries in the table 206b compared to four populated entries in the table 206c), in an embodiment, the key insertion unit 202 inserts the key X into the hash table 206c, in an embodiment.

In some embodiments, the key insertion unit 210 performs a serial insertion search by determining whether a most populated table (the table 206a in the embodiment illustrated in FIG. 2) allows insertion of the key X. If it is determined that the most populated table 206 allows insertion of the key X (i.e., when the indexed location determined for the key X is not already occupied in the most populated table 206), then the key insertion unit 210 inserts the key X into the most populated table 206. On the other hand, if it is determined that the indexed location for the key X is already occupied in the most populated table 206, the key insertion unit 210 determines whether the key X can be inserted into a second most populated table 206 (the table 206b or the table 206d in the embodiment illustrated in FIG. 2), and so on. Because the insertion search is not necessarily performed for all of the hash tables 206 in such embodiments, key insertion generally consumes less power compared to embodiments in which a parallel search for insertion of the key X is performed in all of the hash tables 206, in at least some embodiments.

In some situations, when attempting to insert a key into the lookup table 204, the key insertion unit 210 determines that none of the hash tables 206 allows insertion of the key into the hash table 206. For example, the key hashes to an already occupied table entry in each of the hash tables 206, in an embodiment. In some embodiments, the lookup table 204 includes additional memory space to accommodate insertion of such keys. For example, in some embodiments, to ensure collision free insertion of a particular number of keys into the lookup table 204, the lookup table 204 includes a number of entries that exceeds the maximum number of keys supported by the lookup table 204. For example, for a table of a particular table size (TS) corresponding to a particular number of keys (e.g., 1000 entries), the total number of entries provided in the lookup table, according to an embodiment, is determined according to:

$$\text{Total Memory Size} = 1/(EFS+3\sigma)*TS \qquad \text{Equation 1}$$

where EFS is the expected first miss ration (generally, a number between 0 and 1) for the lookup table, and σ is the standard deviation for the EFS. Alternatively, in another embodiment, such collisions are resolved by providing a content addressable memory (CAM), such as a binary content addressable memory (BCAM) 214. In such embodiments, the key insertion unit 210 is configured to store keys that cannot be inserted into the lookup table 204 in the provided content accessible memory 214. In any case, in at least some embodiments, a suitably high first miss factor achieved for the lookup table 204 results in a small amount of additional memory required to achieve exact match performance of the lookup table 204. For reference, as an example, in an embodiment in which the lookup table 204 includes 512k entries spread over 16 hash functions 206, a first miss ratio of approximately 82% can be achieved, and additional memory large enough to accommodate the remaining 18% of keys is utilized.

Figure 3:
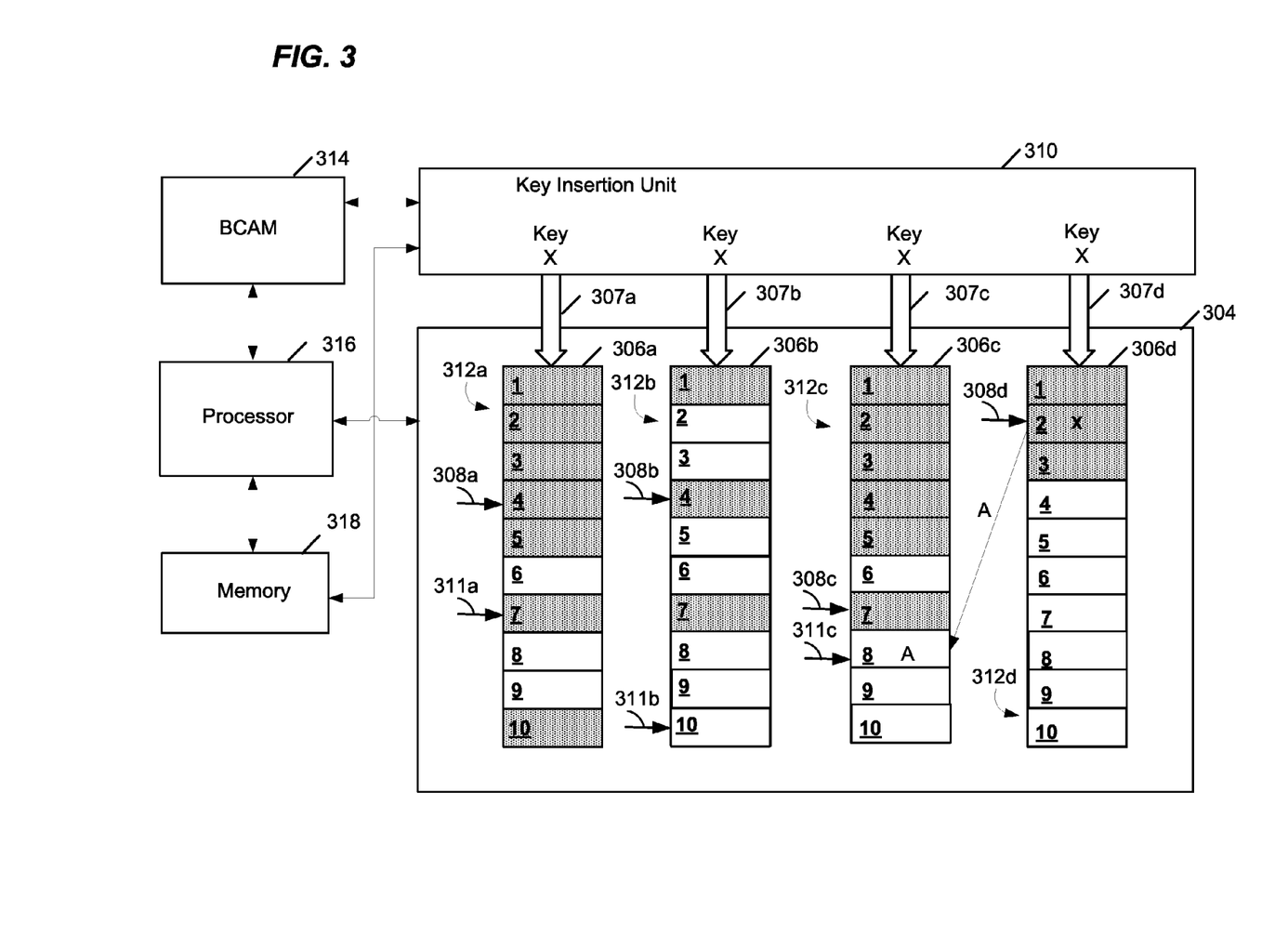
FIG. 3 is a diagram illustrating another example technique for populating an example lookup table, according to another embodiment.

FIG. 3 is a diagram illustrating another example technique for populating an example lookup table 304, according to another embodiment. The lookup table 304 is similar to the lookup table 204 of FIG. 2 and generally utilizes key insertion techniques the same as or similar to the key insertion techniques described above with respect to FIG. 2. However, to further improve performance of the lookup table 304 (e.g., by further increasing the first miss factor for the lookup table 304), the example insertion technique illustrated in FIG. 3 utilizes a cuckoo hashing based key migration algorithm to resolve at least some collisions that occur in the lookup table 304.

The lookup table 304 is generally structured the same or similar to the lookup table 204 of FIG. 2, in some embodiments. In the embodiment of FIG. 3, the lookup table 304 includes or is subdivided into a plurality hash tables 306, and each of the hash tables 306 includes a plurality of entries 312. Each of the hash tables 306 is accessed by a respective hash functions 307. A key insertion unit 310 is provided for inserting keys (and information associated with the keys) into the lookup table 304. To insert a key into the lookup table 304, the key insertion unit 310 generally utilizes techniques the same as or similar to the techniques discussed above with respect to the key insertion unit 210 of FIG. 2. However, the key insertion unit 310 is configured to handle collisions that occur in the hash table 304 differently than the key insertion unit 210 of FIG. 2, in at least some situations.

In the scenario illustrated in FIG. 3, the key insertion unit 310 attempts to insert a key X into the lookup table 304 by providing the key X to each of the hash functions 307. Each of the hash functions 307 generates a respective index 308 into a corresponding hash table 306. In particular, in the embodiment of FIG. 3, the hash functions 304a generates the index 308a corresponding to the entry 4 in the hash table 306a, the hash functions 304b generates the index 308b corresponding to entry 5 in the hash table 306b, the hash functions 304c generates the index 308c corresponding to the entry 7 in the hash table 306c, and the hash functions 304d generates the index 308d corresponding to the entry 2 in the hash table 306d. As in FIG. 2, shading of an entry 312 in FIG. 3 in a hash table 306 signifies that the entry 312 is already occupied by a previously inserted key into the hash table 306. As illustrated in FIG. 3, each index 308a-308d generated for the key X corresponds to a shaded entry in the corresponding hash table 306. Accordingly, the attempt to inset the key X into the lookup table 304 results in a collision in the lookup table 304. In an embodiment, when the key insertion unit 310 encounters a collision in the lookup table 304, the key insertion unit 310 deletes an entry from one of the hash tables 304 to allow insertion of the key X into the freed up memory location in the hash table 304. The key insertion unit 310 then inserts the key X into the memory location in which the deleted key was stored in the hash table 306, and attempts to insert the deleted key into another one of the hash tables 306.

In an embodiment, to maintain an unbalanced load in the lookup table 304 and to generally improve utilization of the lookup table 304, each time the key insertion unit 310 deletes a key from the look up table 304, in the event that the key insertion unit 302 identifies more than one hash table 306 available for reinsertion of the deleted key into the lookup table 304, the key insertion unit 310 selects the most populated table 306 from the identified hash tables 306, and reinserts the deleted key into the selected most populated table 306. For example, in the example embodiment of FIG. 3, to allow insertion of the key X into the lookup table 304, the key insertion unit 310 deletes the key A from the hash table 306d, and inserts the key X into the freed up location in the hash table 306d. The key insertion unit 310 then attempts to insert the removed key A into a different one of the hash tables 306. To this end, in an embodiment, the key insertion unit 310 applies the hash functions 304a, 304b, 304c to the key A, and each of the hash functions 304a, 304b, 304c generates a respective index 310 for the key A. In particular, in the embodiment of FIG. 3, the hash function 307a generates the index 311a into the hash table 306a, the hash function 307b generates the index 311b into the hash table 311b, and the hash function 307c generates the index 311c into the hash table 306c. Because the index 311a corresponds to an already populated entry 7 in the hash table 306a, the key insertion unit 310 identifies the hash tables 306b and 306c as hash tables that allow reinsertion of the key A into the lookup table 304. In an embodiment, the key insertion unit 310 selects the most populated hash table 306 from the identified hash tables 306 for reinsertion of the key A into the lookup table 304 (in this case, the hash table 306c), and inserts the key A into the selected table most populated 306. Alternatively, in some embodiments, the key insertion unit 310 performs a serial insertion by attempting to insert the deleted key into a most populated table 306 and, in an event the deleted key cannot be inserted into the most populate table 306, attempting to insert the deleted key into a second most populated table 306, and so on.

In some embodiments, the key insertion unit 310 is configured to perform multiple iterations of the key migration technique described above. For example, if the key insertion unit 310 determines that the key A hashes to already populated entries in each of the hash tables 306a-306c, then the key insertion unit 310 deletes a key from a table 306, inserts the key A into the location in the table 306 in which the deleted key was stored, and attempts to reinsert the additional deleted key into the lookup table 304 by inserting the key into another one of the hash tables 306. The process of deleting and reinserting keys is repeated until the deleted key is successfully reinserted into the lookup table 304, in an embodiment. To maintain an unbalanced load of the lookup table 304, the key insertion unit 310 attempts to reinsert a deleted key into the lookup table 304 by inserting the key into a most populated hash table 306 selected form the hash tables 306 that allow insertion of the deleted key.

Alternatively, in some embodiments, the key insertion unit 310 performs a conditional deletion of the key A from the hash table 306d, conditioned on ability to perform a collision free insertion of the key A into another one of the hash tables 306. If it is determined that the key A cannot be inserted into another one of the hash tables 306 without colliding with previously stored keys in the other tables 306, then the key insertion unit 310 selects a different key for deletion, and deletes the selected different key, inserts the key A at the memory location corresponding to the different selected key. The key insertion unit 310 then inserts the key X at the memory location in the lookup table 304 corresponding to the selected different key, and attempts to reinsert the selected different key into the lookup table 304 (e.g., by inserting the selected different key into the most populated table 306 available for collision free insertion of the selected different key.

In some embodiments, in order to limit the maximum insertion time for inserting a key, the key migration technique is limited to a certain number of iterations, e.g., to only one iteration, to only two iterations, or to another suitable number of iterations. In an embodiment, a key cannot be inserted in the last iteration, then the key is stored in additional memory in the network device 100, such as in a CAM 314 provided for insertion of keys that cannot be inserted into the lookup table 304, or in additional random access memory (RAM) provided in the lookup table 304.

In some embodiments, a processor 316 is provided for performing some of the iteration of the key migration technique. For example, the processor is used to execute machine readable instruction stored in a memory (e.g., a memory 312), and the machine readable instructions are executed on the processor 316 to cause the processor 316 to perform one or more iteration of the key migration technique. In such embodiments, the key insertion unit 310 performs some iterations, e.g. only one or two iterations, and the processor 316 performs additional iterations when the additional iterations are needed or desired. Further, in some embodiments, to assist the key insertion unit 310 and/or the processor 316 in performing reinsertion of entries deleted from the lookup table 304, and to allow for a deleted key to be more quickly reinserted into the lookup table 304, each index calculated for a key inserted into the lookup table 304 is stored in a memory coupled to and/or accessible by the key insertion unit 310 and/or the processor 316 ((e.g., a memory 312). Then, when a key is deleted from the lookup table 304 and reinsertion of the key into the lookup table 304 is attempted by the key insertion unit 310 or by the processor 316, the hashed value of the key need not be recalculated but can instead be retrieved from the memory 312, making reinsertion of keys more quicker and efficient, in at least some situations.

Figure 4:
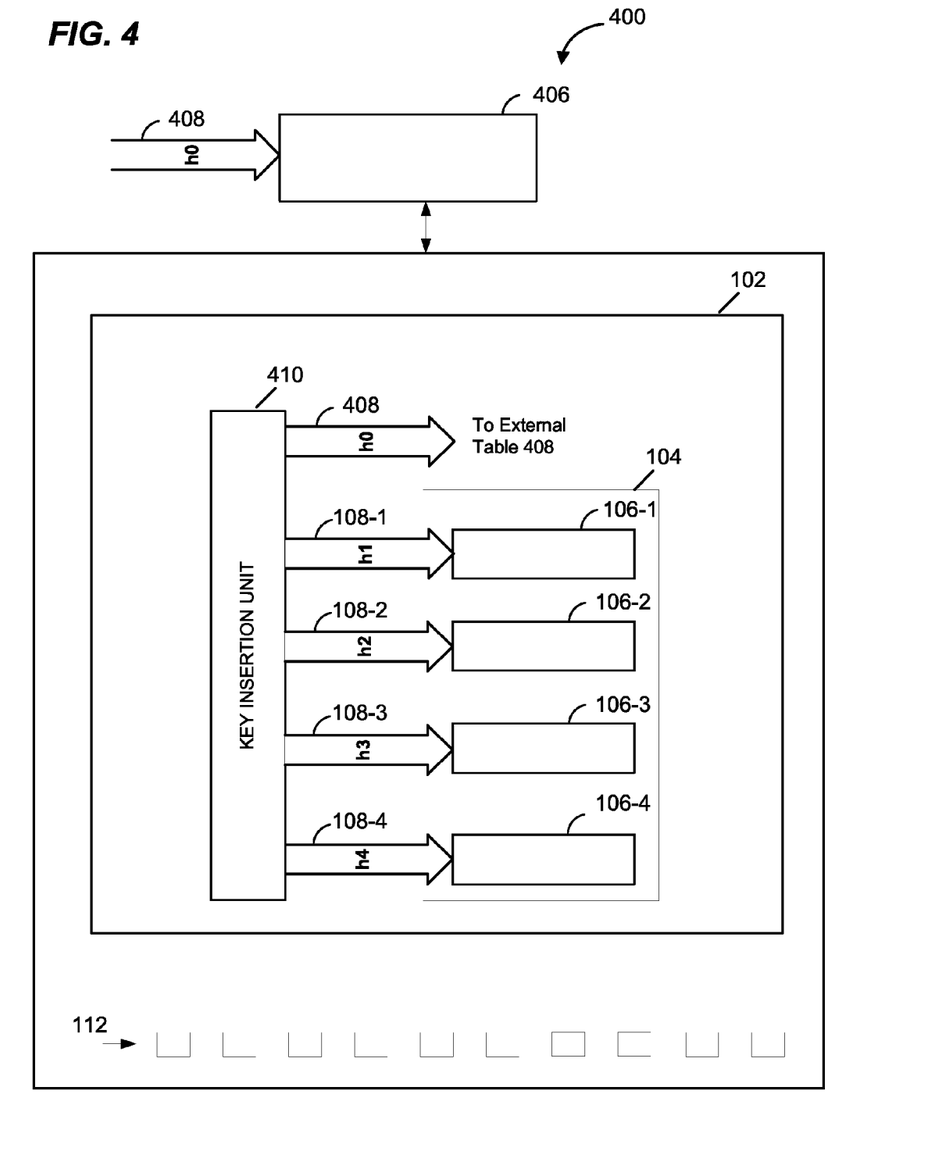
FIG. 4 is a simplified block diagram of a network device 400 that includes external memory in addition to internal memory for storing keys, according to an embodiment.

FIG. 4 is a simplified block diagram of a network device 400 that includes an additional external hash table, in addition to a plurality of internal hash tables for storing keys, according to an embodiment. The network device 400 is generally similar to the network device 100 of FIG. 1, and includes like-numbered elements from FIG. 1 that are not discussed for the purpose of conciseness. In an embodiment, in addition to the lookup table 104, the network device 400 includes an external hash table 406. For example, hash tables 106 of the lookup table 104 are disposed on the same integrated circuit or another suitable device on which the packet processor 102 is disposed, and the additional hash table 406 is included on another integrated circuit or on another suitable memory device that is external to the packet processor 102. The external hash table 406 is generally greater in size compared to the overall size of the internal lookup table 104, in some embodiments. As just an example, in an embodiment, the external lookup table 406 includes a number of entries that ranges between 1M and 2M entries, while the hash tables 106 of the internal lookup table 104 collectively include a number of entries that ranges between 64k and 256k entries, for example. Including an external table of a larger size ensures collision free insertion of a large number of keys by providing additional space to insert a key when a collision results at a memory location corresponding to the hashed value of the key. For example, a suitable algorithm is employed for inserting a key for which a collision results at the memory location corresponding to the hashed value for the key, for example by inserting the key at a next available memory location in the external table or at another suitable available location in the external memory.

The network device 400 includes a key insertion unit 410 configured to insert keys into the external lookup table 406 and the internal lookup table 104, in an embodiment. The key insertion unit 406 generally operates in a manner similar to the key insertion units 110, 210, 310 described above in connection with FIGS. 1, 2 and 3, respectively, with the exception the key insertion unit 410 attempts to first insert each key into the external hash table 406. To this end, in an embodiment, upon receiving a key, the key insertion unit 410 provides the key to the hash function 408, and the hash function 408 generates an index into the external lookup table 406. The key insertion unit 410 then attempts to insert the key (and the information associated with the key) into the external hash table 406. If the external portion 406 allows insertion of the key, the key insertion unit 410 inserts the key and the information associated with the key into the external memory 405. On the other hand, in the event that the external hash table 406 does not allow insertion of the key due to a collision of the key with a previously inserted key into the external hash table 406, the key insertion unit 410 provides the key to each one of the hash functions 108-1 through 108-4, identifies one or more of the internal hash tables 106 that allow insertion of the key, and inserts the key (and information associated with the key) into the internal hash table 104 utilizing one or more insertion and/or key migration techniques discussed above in connection with FIGS. 1-3.

Figure 5:
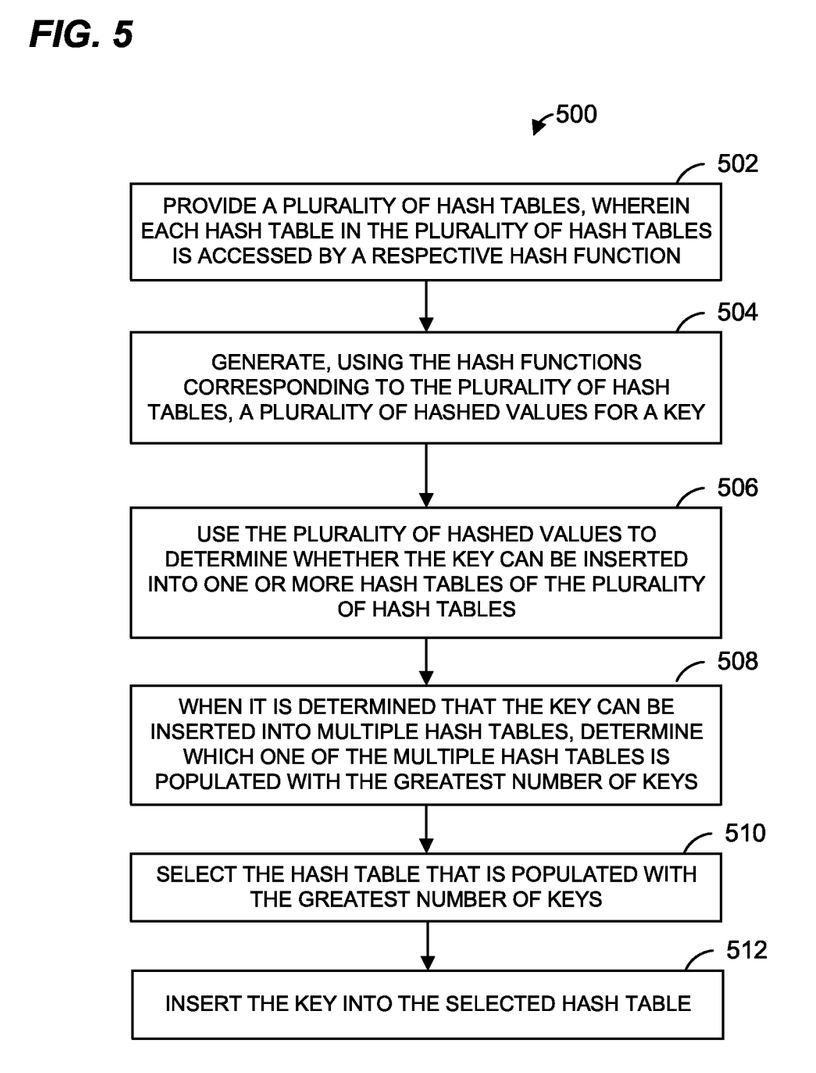
FIG. 5 is a flow diagram of an example method for populating a lookup table, according to an embodiment.

FIG. 5 is a flow diagram of an example method 500 for populating a lookup table, according to an embodiment. In an embodiment, the method 500 is implemented by the network device 100 of FIG. 1 or the network device 400 of FIG. 1. For example, the method 500 is implemented at least partially by the key insertion unit 110 of FIG. 1, in one embodiment. As another example, in another embodiment, the method 500 is implemented at least partially by the key insertion unit 410 of FIG. 4. In yet another embodiment, the method 500 is performed at least partially by the key insertion unit 210 of FIG. 2 or the key insertion unit 310 of FIG. 3. In other embodiments, the method 500 is implemented by other suitable components of the network device 100 (or the network device 400) or by another suitable device and/or in conjunction with another suitable memory space in which a plurality of memory banks are accessed by a packet processor or by a plurality of packet processors. For ease of explanation, the method 500 is described below as being performed, at least partially, by the key insertion unit 210 of FIG. 2

At block 502, a plurality of hash tables are provided. In an embodiment, the plurality of hash tables 206 are provided. In another embodiment, a different plurality of hash tables are provided. In an embodiment, each hash table in the plurality of hash tables is accessed by a respective hash function. As an example, referring to FIG. 2, each hash function 206 is accessed by a respective hash function 207, in an embodiment. At block 504, the plurality of hash functions corresponding to the plurality of hash tables are used to generate a plurality of hashed values for a key. The plurality of hashed values correspond to the indices 208 of FIG. 2, for example.

At block 506, the plurality of hashed values are used to determine whether the key can be inserted into one or more hash tables of the plurality of hash tables. For example, in an embodiment, each respective hashed value is used as an index to the hash table that corresponds to the hash function that generated the hashed value, and it is determined whether the corresponding location in the hash table is occupied by a previously inserted key. When one or more hash tables in which the locations indicated by the corresponding hashed values are not occupied, these hash tables are identified as the hash tables into which the key can be inserted. With reference to FIG. 2, it is determined at block 506 that the key can be inserted into tables 206b and 206c, for example.

When it is determined that the key can be inserted into multiple hash tables, processing at block 508 determines which one of the multiple hash tables is populated with the greatest number of keys. Continuing with the example embodiment of FIG. 2, because the hash table 206b is populated with three keys (at table entries 1, 3, and 4) and the hash table 206c is populated with four keys (at table entries 1, 2, 3, and 4), it is determined at block 508 that the hash table 206c is populated with the greatest number of keys.

At block 510, the hash table that is populated with the greatest number of keys is selected for insertion of the key. Using the scenario illustrated in FIG. 2 as an example, the hash table 206c is selected at block 508, in an embodiment.

At block 512, the key is inserted into the hash table selected at block 510.

In general, the method 500 ensures that a plurality of hash tables in a lookup table utilized for storing keys and information associated with the keys are populated in an unbalanced manner. As described above, employing multiple hash tables in a lookup table and populating the multiple hash tables in an unbalanced manner generally increases table utilization of the lookup table. It is to be noted that the method 500 is not limited to the key insertion techniques described above and other suitable techniques for maintaining an unbalanced load of multiple hash tables in multi-hash lookup tables are utilized in other embodiments.

The various blocks, operations, etc., described above with respect to FIGS. 2-4 may be implemented in hardware, such as in one or more custom integrated circuits, application specific integrated circuits (ASICs), field programmable gate arrays (FPGAs), etc. The various blocks, operations, etc., described above with respect to FIG. 5 may be implemented, in whole or in part, using a processor executing machine readable software and/or firmware instructions.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for populating a lookup table, the method comprising:
   providing a plurality of hash tables, wherein each hash table in the plurality of hash tables is accessed by a respective hash function;
   generating a plurality of hashed values for a key using the hash functions corresponding to the plurality of hash tables;
   using the plurality of hashed values to determine whether the key can be inserted into one or more hash tables of the plurality of hash tables without colliding with keys previously stored at respective memory locations corresponding to the determined hashed values;
   when it is determined that the key can be inserted into multiple hash tables, determining which one of the multiple hash tables is populated with the greatest number of keys;
   selecting the hash table that is populated with the greatest number of keys; and
   inserting the key into the selected hash table.

2. A method according to claim 1, further comprising, when it is determined that the key can be inserted into only a first hash table of the plurality of hash tables, inserting the key into the first hash table.

3. A method according to claim 1, further comprising providing a content addressable memory as additional memory for inserting keys, and when it is determined that the key cannot be inserted into any hash tables from the plurality of hash tables without colliding with keys previously stored at respective memory locations corresponding to the determined hashed values in each hash table of the plurality of hash tables, inserting the key into the provided content addressable memory.

4. A method according to claim 1, wherein the key is a first key, the method further comprising, when it is determined that the first key cannot be inserted into any of the hash tables of the plurality of hash tables without colliding with keys previously stored at respective memory locations corresponding to the determined hashed values in each hash table of the plurality of hash tables, performing the steps of:
   (a) deleting a second key from a hash table of the plurality of hashed tables;
   (b) inserting the first key at a memory location where the second key was stored;
   (c) determining a plurality of hashed values for the second key, the plurality of hashed values corresponding to the respective hash functions for the plurality of hash tables;
   (d) using the plurality of hashed values determined for the second key to determine whether the second key can be inserted into one or more hash tables in a set of hash tables that excludes the hash table from which the second key was deleted;
   (e) when it is determined that the second key can be inserted into multiple hash tables in the set of hash tables, selecting, from the multiple hash tables, a hash table that is populated with the greatest number of keys;
   (f) inserting the second key into the hash table selected in step (e).

5. A method according to claim 4, wherein determining the plurality of hashed values for the second key comprises:
   providing the second key to a set of hash functions in the plurality of hash functions, the set of hash functions corresponding to the set of hash tables; and
   using each hash function in the set of hash functions to generate a respective hashed value for the second key.

6. A method according to claim 4, wherein determining the plurality of hashed values for the second key comprises retrieving the plurality hashed values from a memory used for storing hashed values of keys previously inserted into the hash tables.

7. A method according to claim 4, further comprising, when it is determined the second key cannot be inserted into any of the hash tables of the plurality of hash tables without colliding with keys previously stored at memory locations corresponding to the determined hashed values, performing the steps of:
- (g) deleting a third key from a hash table of the plurality of hash tables;
- (h) inserting the second key at a memory location where the third key was stored;
- (i) determining a plurality of hashed values for the third key, the plurality of hashed values corresponding to the respective hash functions for the plurality of hash tables;
- (j) using the plurality of hashed values determined for the third key to determine whether the third key can be inserted into one or more hash tables in a set of hash tables that excludes the hash table from which the third key was deleted;
- (k) when it is determined that the third key can be inserted into multiple hash tables, selecting, from the multiple hash tables into which the third key can be inserted, a hash table that is populated with the greatest number of keys;
- (l) inserting the third key into the hash table selected in step (k).

8. A method according to claim 5, wherein steps (a) through (f) are performed by hardware, and wherein steps (g) through (l) are performed by a processor executing machine readable instructions that, when executed on the processor, cause the processor to perform steps (g) through (l).

9. A method according to claim 1, wherein the plurality of hash tables are included on an integrated circuit, the method further comprising,
providing an additional hash table for storing keys, wherein the wherein the additional hash table is included on a memory device external to the integrated circuit, and wherein the additional hash table is accessed by an additional hash function corresponding to the additional hash table;
prior to generating the plurality of hashed values for the key using hash functions corresponding to the plurality of hash tables, generating a hashed value for the key using the additional hash function;
using the hash value generated for the key using the additional hash function to determine whether the key can be inserted into the additional hash table; and
when it is determined that the key can be inserted into the additional hash table, inserting the key into the additional hash table.

10. A method according to claim 9, wherein the additional hash table is larger in size compared to a collective size of the plurality of hash tables.

11. A network device, comprising:
a plurality of ports;
a packet processor coupled to the plurality of ports, the packet processor configured to process packets received via at least some of the plurality, wherein the packet processor comprises:
a lookup table that includes a plurality of hash tables,
a plurality of hash functions, wherein each hash function corresponds to a respective hash table of the plurality of hash tables; and
a key insertion unit configured to:
generate a plurality of hashed values for a key using the hash functions corresponding to the plurality of hash tables,
determine, using the plurality of hashed values, whether the key can be inserted into one or more hash tables from the plurality of hash tables without colliding with keys previously stored at respective memory locations corresponding to the determined hashed values,
when it is determined that the key can be inserted into multiple hash tables, determine which one of the multiple hash tables is populated with the greatest number of keys,
select the hash table that is populated with the greatest number of keys, and
insert the key into the selected hash table.

12. The network device of claim 11, wherein the key insertion unit is further configured to, when it is determined that the key can be inserted into only a first hash table of the plurality of hash tables, insert the key into the first hash table.

13. The network device of claim 11, wherein the network device further comprises a content addressable memory for storing keys, and wherein the key insertion unit is further configured to, when it is determined that the key cannot be inserted into any of the hash tables in the plurality of hash tables without colliding with keys previously stored at respective memory locations corresponding to the determined hashed values in each hash table of the plurality of hash tables, insert the key into the content addressable memory.

14. The network device of claim 11, wherein the key is a first key, the key insertion unit further configured to, when it is determined that the first key cannot be inserted into any of the hash tables of the plurality of hash tables without colliding with keys previously stored at respective memory locations corresponding to the determined hashed values in each hash table of the plurality of hash tables:
- (a) delete a second key from a hash table of the plurality of hash tables;
- (b) insert the first key at a memory location where the second key was stored;
- (c) determine a plurality of hashed values for the second key, the plurality of hashed values corresponding to the respective hash functions for the plurality of hash tables;
- (d) use the plurality of hashed values determined for the second key to determine whether the second key can be inserted into one or more hash tables of the plurality of hash tables;
- (e) when it is determined that the second key can be inserted into multiple hash tables, select, from the multiple hash tables into which the second key can be inserted, a hash table that is populated with the greatest number of keys;
- (f) insert the second key into the hash table selected in (e).

15. The network device of claim 14, wherein the key insertion unit is configured to determine the plurality of hashed values for the second key at least by:
providing the second key to a set of hash functions that corresponds to a set of hash tables, wherein the set of hash tables excludes the hash table from which the second key was deleted; and
using each hash function in the set of hash functions to generate a respective hashed value for the second key.

16. The network device of claim 14, wherein the key insertion unit is configured to determine the plurality of hashed values for the second key at least by retrieving the hashed values from a memory used for storing hashed values of keys inserted into the hash tables of the plurality of hash tables.

17. The network device of claim 14, wherein the key insertion unit is further configured to, when it is determined the second key cannot be inserted into any of the hash tables of the plurality of hash tables:
- (g) delete a third key from a hash table of the plurality of hash tables;

(h) insert the second key at a memory location where the third key was stored;

(i) determine a plurality of hashed values for the third key, the plurality of hashed values corresponding to the respective hash functions for the plurality of hash tables;

(j) use the plurality of hashed values determined for the third key to determine whether the third key can be inserted into one or more hash tables of the plurality of hash tables;

(k) when it is determined that the third key can be inserted into multiple hash tables, select, from the multiple hash tables into which the third key can be inserted, a hash table that is populated with the greatest number of keys;

(l) insert the third key into the hash table selected in step (k).

18. The network device of claim 14, wherein steps (a) through (f) are performed by hardware, and wherein steps (g) through (l) are performed by a processor executing machine readable instructions that, when executed on the processor, cause the processor to perform steps (g) through (l).

19. The network device of claim 11, wherein the plurality of hash tables are internal to the network device, wherein the network device is coupled to an external memory device that includes an additional hash table for storing keys, the additional memory accessed by an additional hash function, and wherein the key insertion unit is further configured to:

prior to generating the plurality of hashed values for the key using hash functions corresponding to the plurality of hash tables internal to the network device, generate a hashed value for the key using the additional hash function;

use the hash value generated for the key using the additional hash function to determine whether the key can be inserted into the additional hash table; and when it is determined that the key can be inserted into the additional hash table, insert the key into the additional hash table.

20. The network device of claim 19, wherein the additional hash table is larger in size compared to a collective size of the plurality of hash tables.

\* \* \* \* \*